March 29, 1927.
F. B. WALDRON
1,622,817
METHOD AND APPARATUS FOR PRODUCING A CONTINUOUS STRIP OF GLASS
Filed Nov. 1, 1924
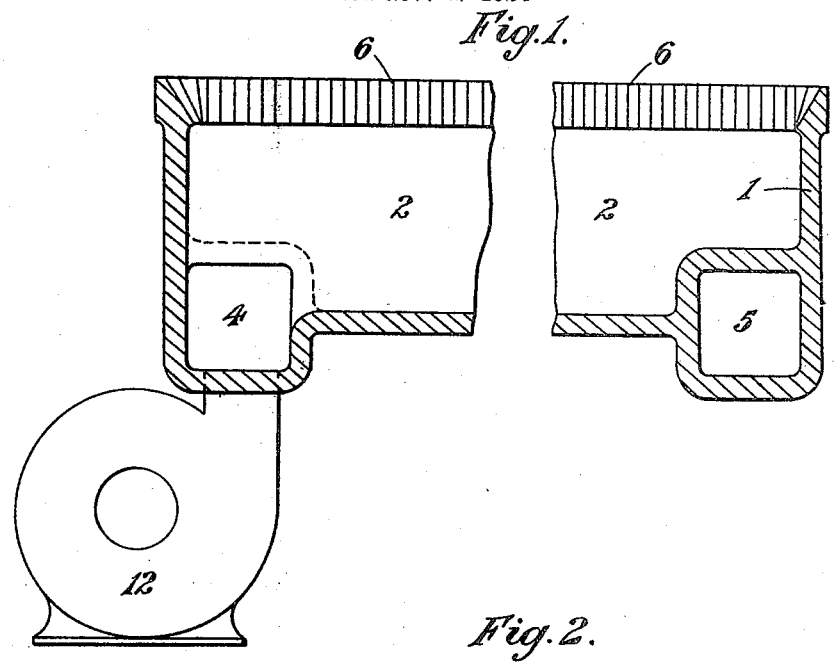
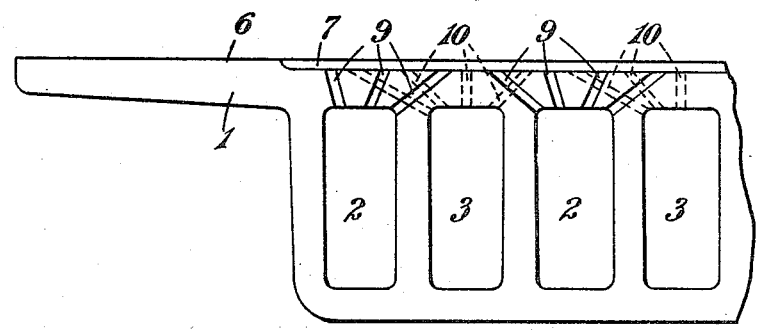
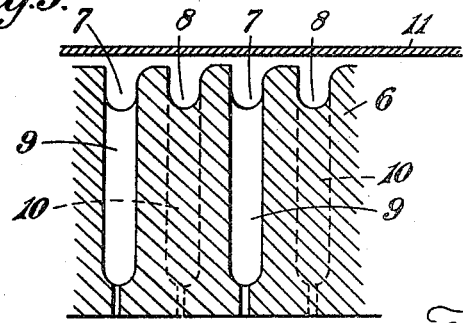
Inventor.
F. B. Waldron
By Rogers, Kennedy Campbell
Attys.

Patented Mar. 29, 1927.

1,622,817

UNITED STATES PATENT OFFICE.

FREDERIC BARNES WALDRON, OF PRESCOT, ENGLAND, ASSIGNOR TO PILKINGTON BROTHERS LIMITED, OF LIVERPOOL, ENGLAND.

METHOD AND APPARATUS FOR PRODUCING A CONTINUOUS STRIP OF GLASS.

Application filed November 1, 1924, Serial No. 747,159, and in Great Britain November 9, 1923.

This invention relates to the process of, and apparatus for, producing a continuous strip of glass and has for its object a support for the strip before it is set, which does not injure its surface.

According to this invention the glass is supported or confined by a layer of air in motion, the air being supplied and mainly removed through a surface which is everywhere separated from the glass by a small distance, and the glass does not come into contact with any solid body until sufficiently set to suffer no injury to its surface from such contact.

The method of bringing the molten glass into the form of a strip forms no part of this invention and may be any known method such as drawing or flowing over a lip or down a chute.

The invention will be described in reference to a flat strip of glass which is supported in a horizontal position while in such a condition that its surfaces are susceptible of taking a fine polish. The strip, however, may be curved or may be supported in an inclined position, and for this reason the term "bed" as hereinafter used throughout the specification and claims is to be understood as indicating the body between the surface of which and the glass the layer of air is present, whether such surface be horizontal, vertical, inclined or curved.

In the accompanying drawings:—

Figure 1 is a vertical longitudinal section, partly broken away, of the bed above which the glass is supported;

Figure 2 is a transverse section of part thereof, in which, for the sake of clearness, the parts in section are not cross-hatched; and Figure 3 is a view on an enlarged scale of a portion of the top member of Figure 1.

The bed 1 contains a plurality of longitudinal passages 2, 3, arranged in alternation, of which the passages 2 are connected to a cross passage 4 and the passages 3 to a cross passage 5. The top member 6 of the bed has on its upper surface a plurality of transverse grooves 7, 8 (Figures 2 and 3) which are respectively connected to the passages 2, 3 by holes 9, 10. The grooves 7, 8, which alternate with each other, and the holes 9, 10 are not shown in Figure 1, save diagrammatically, but are shown on an enlarged scale in Figure 3.

Each groove 7 is connected by holes 9 to one of the passages 2, and each groove 8 is connected by holes 10 to one of the passages 3, and the openings of the holes in each groove are equidistant each from the next.

By a pump 12 or the like, air is caused to flow through the cross passage 4 into each longitudinal passage 2 and through the holes 9 into each groove 7. When a strip of glass 11 (Figure 3) is close above, but not touching, the upper surface of the bed, the air flowing into each groove 7 will flow over the ridges bordering this groove, into the two adjacent grooves 8, and will flow through the holes 10 into the passages 3 and thence through the passage 5.

The whole of the upper surface of the bed therefore is covered by a layer of air in motion from each groove to the adjacent groove, and the strip 11 is supported on this layer of air in motion and by it is prevented from coming into contact with the bed.

Since the air flows to and from the thin layer of air between the bed and the glass 11, through a very large number of holes and/or grooves, the extent of motion of any small body or particle of air between bed and glass, is very small compared with the dimensions of the bed, and consequently the pressure of the air in the thin layer, averaged over small areas, can be maintained uniform throughout. Variations in pressure along the line of flow of any particle of air, are immaterial because the line of flow is very short compared with the dimensions of the bed.

Any means may be employed for introducing air into the passage 4 and for removing it from passage 5, provided that the pressure of the layer of air above the bed is above that of the atmosphere sufficiently to support the glass.

The grooves 7, 8 may be in any direction relatively to the motion of the strip, and need not be straight. Further, each may be divided up into a plurality of short grooves or they may be dispensed with so that the air flows through holes in the upper surface of the bed.

The whole bed may be constructed of a plurality of beds each with its means for producing the flow of air.

Having described my invention, I declare that what I claim and desire to secure by Letters Patent is:—

1. In apparatus for producing a continuous strip of glass comprising a bed adjacent to which the glass passes, means operative to prevent the glass coming into contact with the bed, consisting of a layer of air in motion between the glass and bed through which the latter air is supplied and mainly removed.

2. In apparatus for producing a continuous strip of glass comprising a bed over which the glass passes, means operative to support the glass to prevent it coming into contact with the bed, consisting of a layer of air in motion between the glass and the bed through which latter the air is supplied and mainly removed.

3. In apparatus for producing a continuous strip of glass, means according to claim 1, characterized by a plurality of apertures in the bed through which air flows to the layer of air, and a second plurality of apertures in the bed through which air flows from the layer, each aperture of the first plurality being adjacent to at least one aperture of the second plurality and vice versa.

4. In apparatus for producing a continuous strip of glass, means according to claim 1, characterized by a plurality of grooves in the surface of the bed, arranged in two series, the grooves of each series alternating with those of the other series, the grooves of one series serving to conduct air to the layer and the grooves of the other series serving to conduct air from the layer.

5. In apparatus for producing a continuous strip of glass, means according to claim 1, characterized by a plurality of grooves in the surface of the bed, arranged in two series, the grooves of each series alternating with those of the other series, the grooves of one series serving to conduct air to the layer and the grooves of the other series serving to conduct air from the layer and a plurality of holes extending through the bed from each groove, the said holes serving to conduct air to or from the groove.

6. In apparatus for producing a continuous strip of glass, means according to claim 1, characterized by a plurality of grooves in the surface of the bed, arranged in two series, the grooves of each series alternating with those of the other series, the grooves of one series serving to conduct air to the layer and the grooves of the other series serving to conduct air from the layer and a plurality of holes extending through the bed from each groove, the said holes serving to conduct air to or from the groove, each hole in one groove, except those at the ends thereof, being equi-distant from two holes in each of the two adjacent grooves.

7. In apparatus for producing a continuous strip of glass, means according to claim 1, characterized by a plurality of apertures in the bed through which air flows to the layer of air, and a second plurality of apertures in the bed through which air flows from the layer, each aperture of the first plurality being adjacent to at least one aperture of the second plurality and vice versa and means adapted to supply air under pressure to each aperture of one of the pluralities.

8. In apparatus for producing a continuous strip of glass, means according to claim 1, characterized by a plurality of apertures in the bed through which air flows to the layer of air, and a second plurality of apertures in the bed through which air flows from the layer, each aperture of the first plurality being adjacent to at least one aperture of the second plurality and vice versa and a plurality of passages below the bed, one series of alternate passages being connected to one plurality of apertures and the other series of alternate passages being connected to the other plurality of apertures.

9. In apparatus for producing a continuous strip of glass, means according to claim 1, characterized by a plurality of apertures in the bed through which air flows to the layer of air, and a second plurality of apertures in the base through which air flows from the layer, each aperture of the first plurality being adjacent to at least one aperture of the second plurality and vice versa, a plurality of grooves in the surface of the bed, arranged in two series, the grooves of each series alternating with those of the other series, the grooves of the two series serving to conduct air respectively to and from the layer, a plurality of alternating series of passages below the bed, connected respectively to the different series of alternate grooves, and means adapted to supply air under pressure to one series of alternate passages.

10. In a process for producing a continuous strip of glass, in which the glass passes adjacent to a bed, preventing the glass from coming into contact with the latter by a layer of air in motion between the bed and the glass, the extent of motion between the bed and glass, of any particle of air being very small compared with the dimension of the bed.

11. In a process for producing a continuous strip of glass, in which the glass passes adjacent to a bed, preventing the glass from coming into contact with the latter by a layer of air in motion between the bed and the glass, the air between the bed and glass, flowing from one groove to an adjacent groove in the said bed.

In testimony whereof I have affixed my signature hereto.

FREDERIC BARNES WALDRON.